Figure 1:
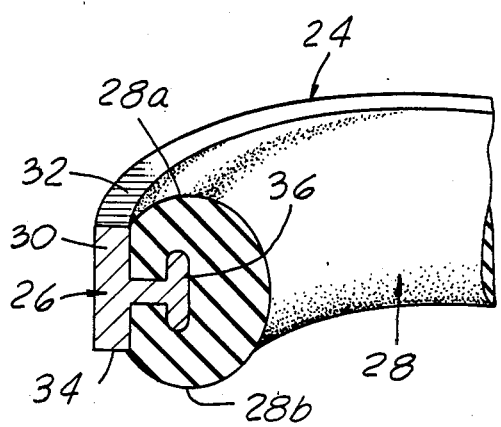

United States Patent [19]
Fallon et al.

[11] Patent Number: 4,674,756
[45] Date of Patent: Jun. 23, 1987

[54] STRUCTURALLY SUPPORTED ELASTOMER SEALING ELEMENT

[75] Inventors: Merton R. Fallon, Thousand Oaks; John Froehler, Canoga Park, both of Calif.

[73] Assignee: Draft Systems, Inc., Northridge, Calif.

[21] Appl. No.: 856,400

[22] Filed: Apr. 28, 1986

[51] Int. Cl.⁴ .............................................. F16J 15/18
[52] U.S. Cl. .................... 277/30; 277/116.2; 277/166; 277/180; 277/188 R; 277/211
[58] Field of Search .................. 277/166, 180, 188 R, 277/188 A, 207 R, 211, 227, 228, 235 B, 116.2, 30

[56] References Cited

U.S. PATENT DOCUMENTS

| | | | |
|---|---|---|---|
| 2,219,064 | 10/1940 | Boyer et al. | 277/30 |
| 3,153,541 | 10/1964 | Rudder | 277/180 |
| 4,345,739 | 8/1982 | Wheatley | 277/166 |
| 4,428,590 | 1/1984 | Pippert et al. | 277/166 |
| 4,483,543 | 11/1984 | Fisher et al. | 277/188 R |

FOREIGN PATENT DOCUMENTS 1286052  1/1962  France ............................ 277/180

Primary Examiner—Robert S. Ward, Jr.
Attorney, Agent, or Firm—James E. Brunton

[57] ABSTRACT

A sealing element which is particularly adapted for use in preventing fluid flow between threadably interconnected components. The sealing element comprises a rigid portion formed of metal or the like and an elastomeric material portion. These portions are assembled together in a geometric configuration that protects the elastomer from shear forces and at the same time permits close control over the compression forces which can be exerted on the elastomeric portion of the sealing element. In this way, both overcompression and shear damage to the elastomer are effectively prevented.

7 Claims, 11 Drawing Figures

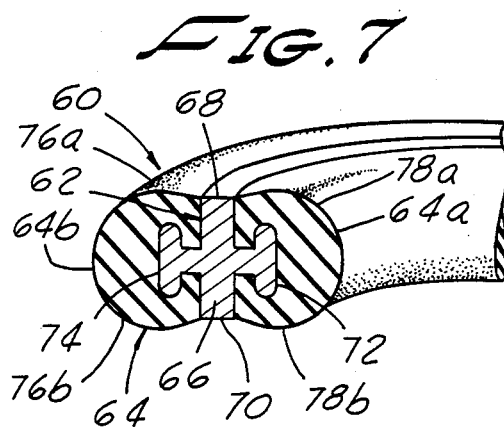
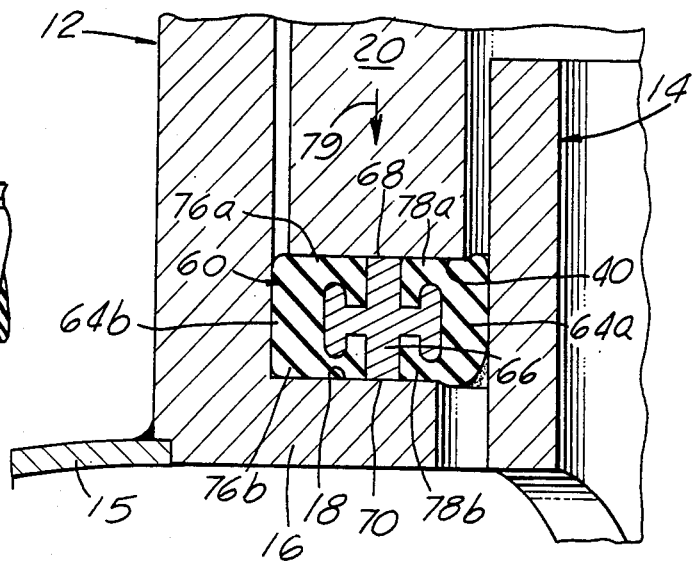
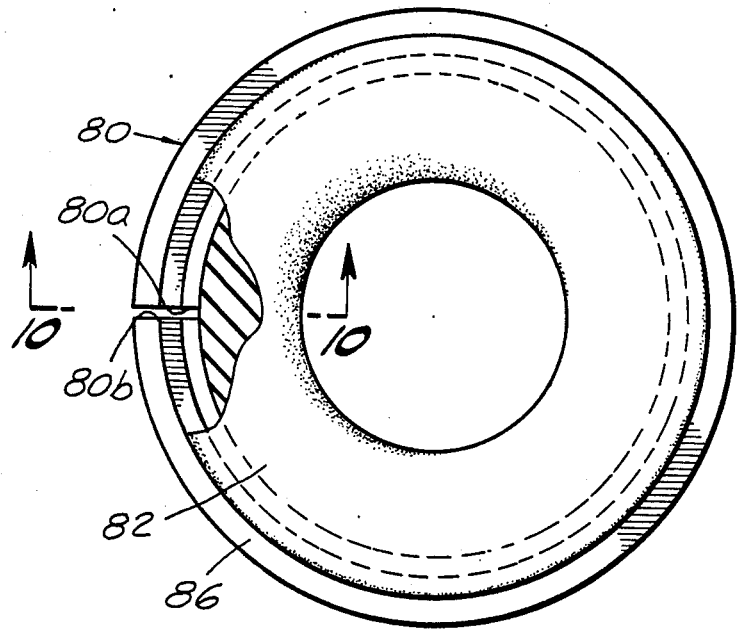
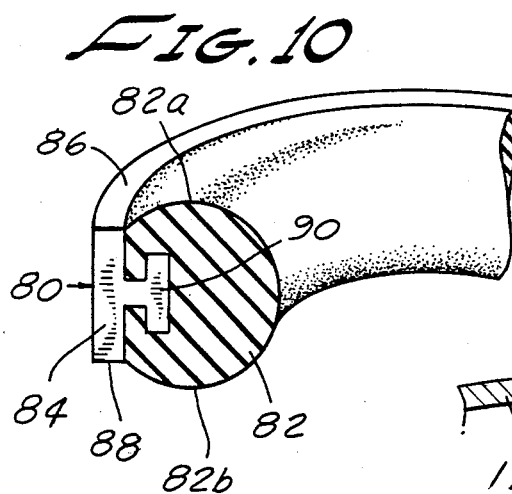
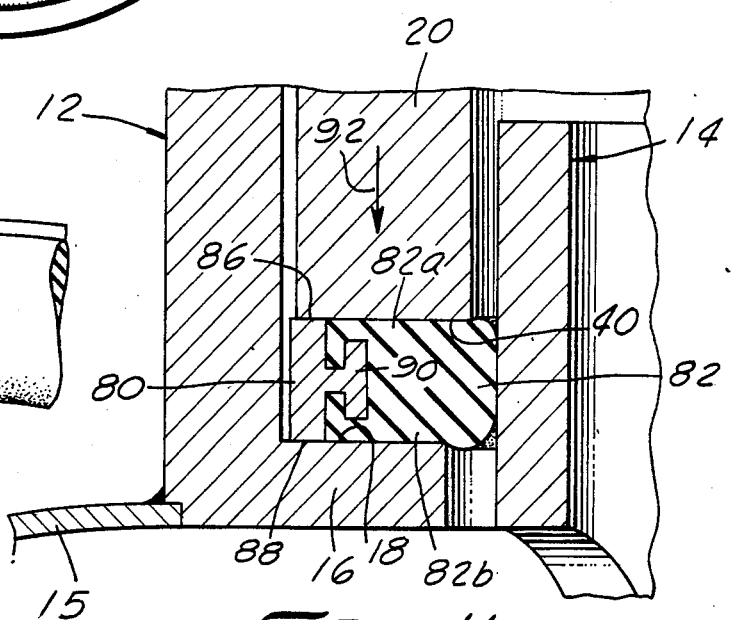

STRUCTURALLY SUPPORTED ELASTOMER SEALING ELEMENT

BACKGROUND OF THE INVENTION

1. Field of the Invention

The present invention relates generally to elastomeric seals. More particularly the invention concerns an elastomeric sealing element of unique configuration which is particularly adapted for use in sealing valving assemblies within beverage containers such as beer kegs and the like.

2. Discussion of the Prior Art

Elastomeric material, such as rubber and soft plastic which has been formed into O-rings and like configurations have long been used to sealably interconnect component parts of fluid systems. Frequently the elastomeric sealing member, such as the O-ring, is carried by one component of the system so that upon assembly of the system components the elastomeric member will be axially deformed causing a portion thereof to be urged into pressural engagement with another of the components thereby providing a fluid seal between the components.

While elastomeric seals have proven effective in performing the sealing function, they are easily damaged by uncontrolled axial and shear forces being exerted on the seals during assembly and disassembly of the fluid systems. High shear forces tend to abrade, deform and otherwise damage the elastomeric material. Uncontrolled axial forces tend to compress the material beyond its elastic limits. This results in excessive "compression set", which is a measure of the inability of an elastomer to return to its original uncompressed state after it has been subjected to actual material compression. If the elastomer once takes a "compression set" its sealing capability is reduced and may have to be replaced if fluid leakage is to be avoided.

Although the sealing element of the present invention is useful in a wide variety of fluid sealing applications, it is particularly useful in sealing valving assemblies to beverage containers, such as beer kegs and the like. For example, in systems for tapping kegs of fluid and particularly containers of beer, a valve assembly is secured to the top of the keg for providing access to the fluid ultimately to be delivered from the keg to a remote location for distribution. Typically, the valve assembly includes a dual valve arrangement with a siphon tube which extends from the valve assembly to the bottom of the keg. The valve assembly is fixed within a valve receiving member to provide a valved access to the fluid once it is pressurized. The valve system, when tapped by a coupler or some other keg tapping means connected to a pressure source, allows pressurized gas to flow into the keg until the desired pressure within the keg is achieved to force the fluid out of the keg through the valve system and ultimately to a distribution device which the fluid can be used to fill glasses and the like.

In many prior art systems the valve assembly is threadably received with the valve receiving member which, in turn, is affixed within an aperture formed in the fluid container. As a general rule, an elastomeric seal of standard configuration is used to prevent fluid leakage between the valving assembly and the valve receiving member. Such an arrangement has resulted in substantial problems.

Two basic problems exist when an elastomeric ring is used as the sealing means between threadably interconnected components. One obvious problem is the potential damage to the elastomer as a result of the shear forces applied to it as the components are rotatably connected and disconnected. The second, and even greater problem, derives from the fact that the torquing of the valving assembly into the receiving member, even at a relatively fixed torque of say 50 foot-pounds, provides very little control over the resulting thrust being exerted on the elastomeric ring. Because of dimensional variations in the components and dimensional variations in the threads, excessive compression of the elastomer can result even under fixed torque conditions. This uncontrolled compression can easily cause compression set which destroys the sealing effectiveness of the elastomeric ring.

It is also to be noted that in a system embodying an elastomeric seal, even effective control over assembly torque does not necessarily provide control over disassembly torque. In point of fact, experience has shown that the only known relationshp between installation and removal torque in a threadable engagement with a pure elastomer seal interposed between metal components is that the removal torque will always be less than the installation torque; but without predictable or quantitative lineal relationship. Tests have shown that a constant installation torque of 50 foot-pounds results in removal torques that vary from 90% down to 25% of the installation torque.

In summary, prior art threaded systems embodying a standard type of elastomer seal are deficient in several critical aspects. In such systems, the elastomeric seal is exposed to uncontrolled thrust, high shear, uncontrolled deformation or compression, as well as uncontrolled removal torques.

As will be apparent from the discussion which follows, the novel sealing element of the present invention overcomes all of the aforementioned disadvantages of the prior art.

SUMMARY OF THE INVENTION

The thrust of the present invention is to provide a uniquely configured sealing element which is particularly adapted for use in preventing fluid flow between threadably interconnected components. The sealing element comprises a rigid portion formed of metal or the like and an elastomeric material portion. These portions are assembled together in a geometric configuration that protects the elastomer from shear forces and at the same time permits close control over the compression forces which can be exerted on the elastomeric portion of the sealing element. In this way, both overcompression and shear damage to the elastomer are effectively prevented. Through close control of the shear and compression forces that can be exerted on the element, the life of the elastomeric seal can be considerably extended and its operational reliability substantially enhanced.

It is a particular object of the invention to provide a highly reliable elastomeric sealing element of novel geometric configuration for use in sealably interconnecting component parts of beverage containers, liquid pressure vessels, gas pressure vessels and the like, wherein seal effectiveness is highly important to operational safety and product quality.

It is another object of the invention to provide an elastomeric sealing element of the aforementioned character which is particularly suited for use in fluid systems wherein the components are threadably interconnected.

Still another object of the invention is to provide a sealing element of the character described in the preceding paragraphs which is highly reliable in use and will withstand high frequency thermal shocks of the type normally experienced in the cleaning, processing and filling of beverage containers.

Yet another object of the invention is to provide an elastomeric sealing element of the class described which can be readily and reproducably manufactured in high volume at low cost.

DESCRIPTION OF VARIOUS FORMS OF THE INVENTION

Figure 2:
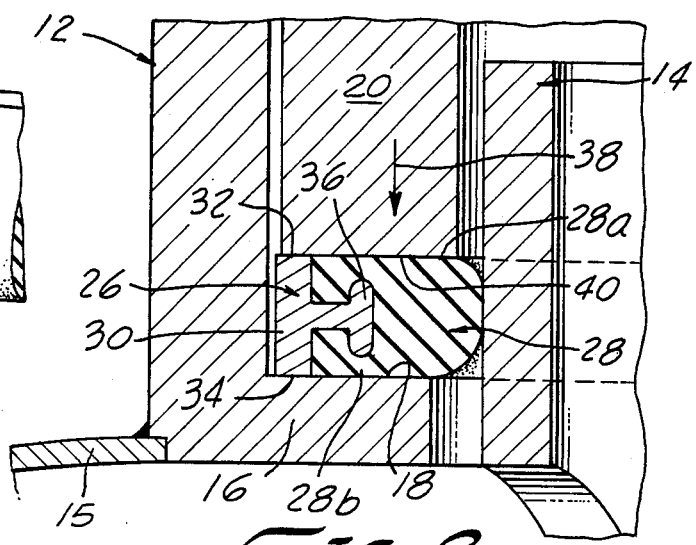

Referring to the drawings and particularly to FIGS. 1 and 2, one embodiment of the sealing means of the present invention is thereshown. In this form of the invention, the sealing means is adapted for use in sealably interconnecting first and second cooperating numbers 12 and 14 respectively. In the drawings, first member 12 is shown as a valve receiving member, or neck, of the character typically used in beer kegs. As best seen in FIG. 2, the valve receiving member, or neck, 12 is affixed to the top wall 15 of a beer keg as by welding. This first member, or neck, 12 has the shape of a hollow cylinder and includes a radially inwardly extending, annular shaped portion 16 having a first upper sealing surface 18.

The valving assembly of the character typically used in dispensing beverage such as beer from a keg or other container comprises a generally cylindrically shaped valve body 20 and a cooperating member such as a spring retainer depicted in FIG. 2 as the second member 14. In practice, the second member in cooperation with the valving assembly, functions to dispense the beer from the keg through a coupling device to a remote location. A highly successful form of valving assembly, neck and coupler is illustrated and described in detail in U.S. Pat. No. 4,181,143, issued to one of the present co-inventors. Reference is made to this patent for the details of the construction of a typical valving assembly of the character referred to herein.

To prevent leakage of fluid between member 14 on the one hand and the valve body 20 and the neck 12 on the other hand, a seal must be provided. In the present embodiment of the invention this seal is provided by a sealing means of the configuration shown in FIG. 1 and generally designated by the numeral 24.

Sealing means 24 comprises a rigid portion 26 and an elastomeric portion 28 carried by rigid portion 26. In the form of the sealing means shown in FIG. 1, rigid portion 26 comprises a generally ring-shaped body 30 having circumferentially extending edges defining first and second surfaces 32 and 34. Affixed to ring-shaped body 30 is a radially inwardly extending ring-shaped first member 3 which is generally "T" shaped in cross-section. This "T" shaped member 36 is substantially encapsulated by the elastomeric portion 28 of the assemblage.

As indicated in FIG. 1, the elastomeric portion 28 is generally eliptical in cross-section, having upper and lower portions 28a and 28b which protrude above and below the planes of surfaces 32 and 34 when the elastomeric portion is in a relaxed state.

When the sealing means shown in FIG. 1 is positioned within first, or neck, member 12, portion 28b of the elastomeric ring is in engagement with the sealing surface 18 of radially inwardly extending flange 16. In the uncompressed state, the inner circumferentially extending surface of elastomeric portion 28 is slightly spaced apart from second member, or spring retainer 14. In order to move the sealing means into sealable engagement with member 14, it is necessary that an axial force be exerted on the sealing means in the direction of the arrow 38 of FIG. 2. In the present form of the invention, this axial force is exerted by a third member here taking the form of valve body 20. As this third, or actuating, member 20 is assembled within neck 12, the seating surface 40 of member 20 is moved into engagement with portion 28a of elastomeric ring 28. Continued axial movement of member 20 will cause the elastomeric portion 28 to flow, or be controllably deformed, within the circumferentially extending radial space between the sealing means and the wall of the siphon tube 14 so as to move into pressural sealing engagement with the outer wall of member 14 in the manner shown in FIG. 2. In this sealing position, the upper surface 28a of elastomeric ring 28 is in sealing engagement with surface 40 of member 20 and the lower portion 28b of the elastomeric ring 28 is similarly in sealing engagement with surface 18 of radially inwardly extending flange 16. Similarly, the downward force exerted by member 20 causes the elastomeric portion 28 to deform from its relaxed configuration shown in FIG. 1 to the configuration shown in FIG. 2 so that the innermost portion of ring 28 moves into pressural engagement with the outer wall of member 14, thereby preventing leakage of fluid between members 14 and 20.

A highly important feature of the sealing means of the present invention is the provision of rigid portion 26 which functions to preclude overcompression of elastomeric portion 28 of the sealing means. As best seen in FIG. 2, as member 20 is moved downwardly into engagement with surface 28a of elastomeric ring 28, surface 40 of member 20 will also move into engagement with surface 32 of ring 30. Continued downward movement of member 20 will also cause surface 34 of ring 30 to move into engagement with surface 18 of radially inwardly extending flange 16 of first member 12. At this point, rigid member 26 precludes any further downward movement of member 20 and accordingly positively resists any further compression of elastomeric portion 28 of the sealing means. Through proper design of the height of ring 30, an optimum axial pressure can be exerted on elastomeric ring 28 so as to ensure adequate sealing of the component parts of the assembly while at the same time positively guarding against any over compression of the resilient portion 28 of the sealing means would could cause an undesirable compression set.

As previously mentioned, the function of rigid member 26 is particularly important when the first and third members, are threadably interconnected so that deformation of elastomeric portion 28 is caused as the threaded members are rotatably mated. In these types of assemblages, because of dimensional variations in the components and dimensional variation in the threads, excessive compression of the elastomeric portion can easily result even under fixed torque conditions. This uncontrolled compression of the elastomeric portion can cause compression set which functions to destroy the sealing effectiveness of the elastomeric ring. However, because of the unique positioning of rigid portion 26 within the assemblage, such overcompression of the elastomeric portion 28 is positively prevented. Accordingly, the sealing means of the invention may be used repeatedly and undergo successive compressions and relaxations without in any way effecting the sealing effectiveness of the elastomeric portion 28.

While the sealing means of the invention is particularly effective for use in assemblies which are threadably interconnected, the rigid portion also serves as a positive guard against over compression when the third member, or member 20, is moved in the direction of arrow 38 by mechanical means other than threads. Stated another way, without regard to the mechanical means by which force is exerted on the elastomeric portion 28 by member 20, the rigid portion 30 of the means will effectively prevent undesired overcompression of the elastomeric portion 28 of the sealing means.

Figure 3:
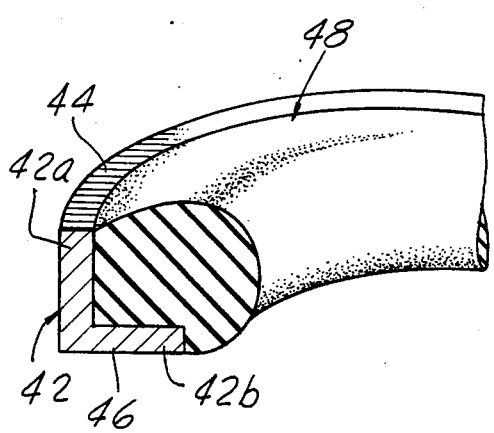
Figure 4:
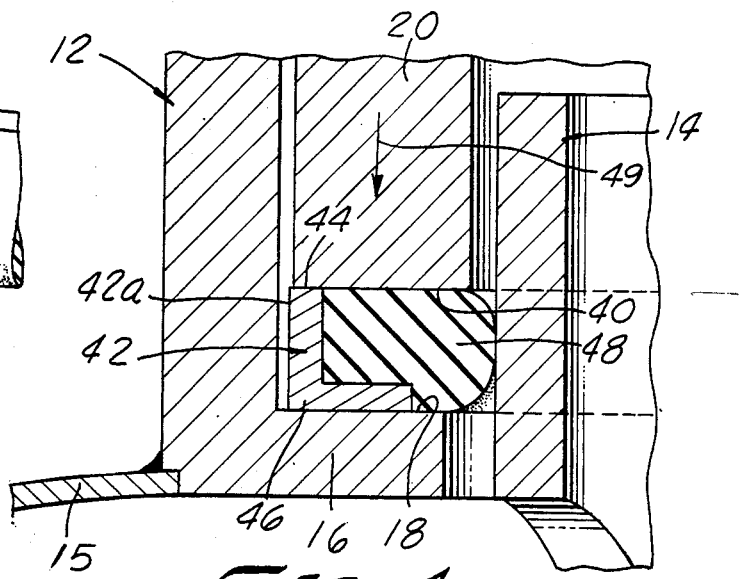

Referring now to FIGS. 3 and 4, there is shown a sealing means of slightly different configuration. This sealing means, like the sealing means of FIG. 1, however, is used to sealably interconnect first, second and third members 12, 14 and 20 which, as shown in FIG. 4, are of identical configuration to those shown in FIG. 2. Once again the first, second and third members are shown in FIG. 4 as component parts of a valve receiving member, or neck, 12 and a valve assembly of the character used in withdrawing beverage from a container such as a keg 15. It is to be understood, however, that the sealing means of the invention is not limited to use in beverage dispensing applications. Quite to the contrary, the sealing means may be effectively used in any application wherein it is desired to sealably interconnect first and second members through the exertion of axial force on the sealing means by a third member such as member 20.

Referring particularly to FIG. 3, the form of the sealing means of this embodiment of the invention is different from that shown in FIGS. 1 and 2 in that the rigid member depicted in FIG. 3 by the numeral 42, while being ring shaped, is substantially "L" shaped in cross sectional configuration. In this embodiment, the first, or upper, surface 44 of the rigid member is defined by the upper edge of one leg 42a of member 42. The second, or lower surface 46 of the rigid member 42 is defined by the lower surface of leg 42b of ring-shaped member 42.

The elastomeric portion 48 of the sealing means of FIG. 3 is carried by rigid member 42 in the manner shown in FIG. 3 and may be bonded or otherwise fixed to the inner surfaces of legs 42a and 42b of the rigid member 42. As best seen by referring to FIG. 4, when the sealing means of the configuration shown in FIG. 3 is inserted within first member 12 and is deformed through the exertion of an axial force by member 20 in the direction of the arrow 49, the elastomeric portion 48 will be deformed so that the innermost circumferentially extending surface thereof is brought into pressural engagement with the outer wall of member 14. Similarly, the upper and lower surfaces of the elastomeric portion 48 will be moved into sealable engagement with surface 40 of member 20 and surface 18 of member 12.

As illustrated in FIG. 4, in the present embodiment of the invention, the rigid portion 42 of the sealing means also functions to effectively control the extent of movement of member 20 relative to surface 18, thereby effectively limiting the degree of compressive force which may be exerted on elastomeric portion 48. In this instance, this force limitation is accomplished by the lower surface 40 of member 20 moving into engagement with surface 44 of rigid member 42 while surface 46 of the rigid member moves into engagement with surface 18 of member 12. Once again, the spacing between surfaces 44 and 46 is designed so that an optimum deformation of elastomeric portion 48 will result so as to ensure tight sealing among the component parts while at the same time limiting the amount of compressive force which can be exerted on the elastomeric. In this way any possibility of compression set of the elastomeric material is effectively reduced substantially.

Figure 5:
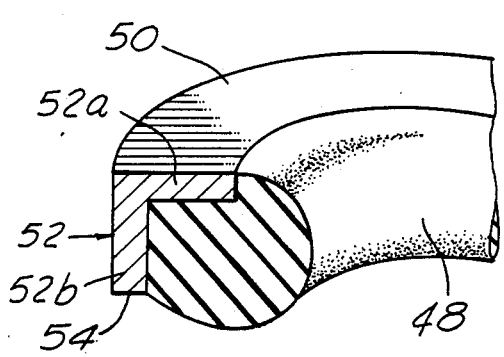
Figure 6:
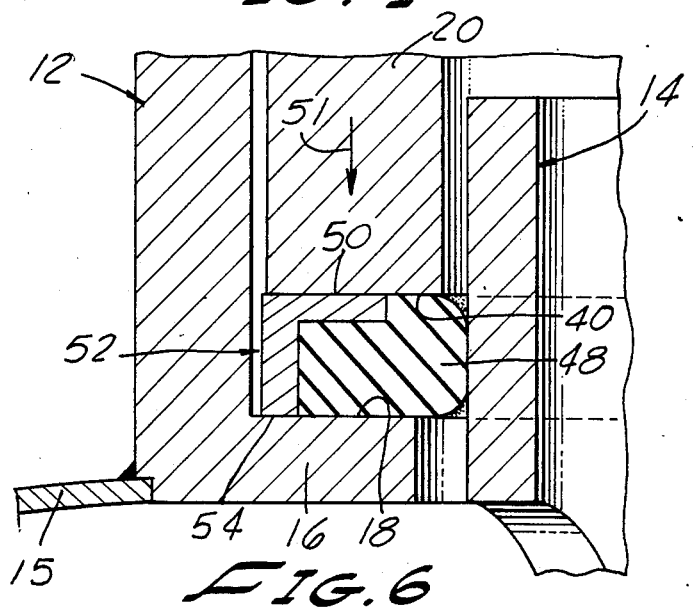

Referring now to FIGS. 5 and 6, there is shown a sealing means of similar configuration to that shown in FIGS. 3 and 4. This sealing means, however, while used to sealably interconnect first, second and third members 12, 14 and 20 in the manner shown in FIG. 6, is inverted in the assemblage. As before, the first, second and third members are shown in FIG. 6 as component parts of a valve receiving member, or neck, 12 and a valve assembly of the character used in withdrawing beverage from a container such as a keg 15.

Referring particularly to FIG. 5, the form of the sealing means of this embodiment of the invention, like that shown in FIG. 3, is also substantially "L" shaped in cross sectional configuration. In this embodiment, however, the first, or upper, surface of the rigid member is defined by the upper surface 50 of leg 52a of rigid member 52, while the second surface is defined by the lower edge 54 of leg 52b of rigid member 52.

The elastomeric portion 48 of the sealing means of FIG. 5 is identical to that shown in FIG. 3 and is carried by rigid member 52 in the manner shown in FIG. 5 and may be bonded or otherwise fixed to the inner surfaces of legs 52a and 52b of the rigid member 52. As best seen by referring to FIG. 6, when the sealing means of the configuration shown in FIG. 5 is inserted within first member 12 and is deformed through the exertion of an axial force by member 20 in the direction of the arrow 51, the elastomeric portion 48 will be deformed so that the innermost circumferentially extending surface thereof is brought into pressural engagement with the outer wall of member 14. Similarly, the upper and lower surfaces of the elastomeric portion 48 will be moved into sealable engagement with surface 40 of member 20 and surface 18 of member 12.

Once again, as illustrated in FIG. 6, in this embodiment of the invention, the rigid portion 52 of the sealing means also functions to effectively control the extent of movement of member 20 relative to surface 18, thereby effectively limiting the degree of compressive force which may be exerted on elastomeric portion 48. In this instance, this force limitation is accomplished by the lower surface 40 of member 20 moving into engagement with surface 50 of rigid member 52 while surface 54 of the rigid member moves into engagement with surface 18 of member 12. Once again, the spacing between surfaces 50 and 54 is designed so that an optimum deformation of elastomeric portion 48 will result so as to ensure tight sealing among the component parts while at the same time limiting the amount of compressive force which can be exerted on the elastomeric. In this way any possibility of compression set of the elastomeric material is effectively prevented.

Turning now to FIGS. 7 and 8 there is shown yet another sealing means of slightly different configuration. This sealing means, like the sealing means previously described herein, is used to sealably interconnect first, second and third members 12, 14 and 20 which, as shown in FIG. 8, are of identical configuration to those shown in FIG. 2. Once again, the first, second and third members are shown in FIG. 8 as component parts of a valve receiving member, or neck, 12 and a valve assembly of the character used in withdrawing beverage from a container such as keg 15.

The sealing means 60 of this form of the invention is somewhat similar to that shown in FIG. 1 and comprises a rigid portion 62 and an elastomeric portion 64 carried by rigid portion 62. In the form of the sealing means shown in FIG. 7, rigid portion 62 comprises a generally ring-shaped body 66 having circumferentially extending edges defining first and second surfaces 68 and 70. Affixed to ring-shaped body 66 is a radially inwardly extending ring-shaped first member 72 which is generally "T" shaped in cross-section. This "T" shaped member 72 is substantially encapsulated by elastomeric portion 64a of the assemblage.

Also affixed to ring-shaped body 66 is a radially outwardly extending ring-shaped second member 74 which is generally "T" shaped in cross-section. This "T" shaped member 74 is substantially encapsulated by elastomeric portion 64b of the assemblage.

Elastomeric portions 64a and 64b are both generally eliptical in cross-section, having upper and lower portions which protrude above and below the planes of surfaces 68 and 70 when the elastomeric portion is in a relaxed state.

When the sealing means shown in FIG. 7 is positioned within first, or neck, member 12, portion 76b of the elastomeric ring portion 64b is in engagement with the sealing surface 18 of radially inwardly extending flange 16. Similarly, portion 78b of the elastomeric ring portion 64a is in engagement with the sealing surface 18. In the uncompressed state, the inner circumferentially extending surface of elastomeric portion 64a is slightly spaced apart from second member 14. In order to move the sealing means into sealable engagement with member 14, it is necessary that an axial force be exerted on the sealing means in the direction of the arrow 79 of FIG. 8. In the present form of the invention, this axial force is exerted by a third member here taking the form of valve body 20. As this third, or actuating, member 20 is assembled within neck 12, the seating surface 40 of member 20 is simultaneously moved into engagement with portion 76a of elastomeric ring 64b and with portion 78a of ring portion 64a. Continued axial movement of member 20 will cause the elastomeric portion 64 to flow, or be controllably deformed, so as to move the inner circumferential portion of ring 64a into pressural sealing engagement with the outer wall of member 14 in the manner shown in FIG. 8. In this sealing position, the upper surfaces of elastomeric ring 64 are in sealing engagement with surface 40 of member 20 and the lower portions of the elastomeric ring 64 are similarly in sealing engagement with surface 18 of radially inwardly extending flange 16. Similarly, the downward force exerted by member 20 causes the elastomeric portion 64b to deform from its relaxed configuration shown in FIG. 7 to the configuration shown in FIG. 8 so that the innermost portion of ring 64b moves into pressural engagement with the inner wall of member 12, thereby preventing leakage of fluid between members 12 and 14.

As best seen in FIG. 8, as member 20 is moved downwardly into engagement with the upper surfaces of elastomeric ring 64, surface 40 of member 20 will also move into engagement with surface 68 of ring 66. Continued downward movement of member 20 will also cause surface 70 of ring 66 to move into engagement with surface 18 of radially inwardly extending flange 16 of first member 12. At this point, rigid member precludes any further downward movement of member 20 and accordingly positively resists any further compression of elastomeric portion 28 of the sealing means. Through proper design of the height of ring 66, an optimum axial pressure can be exerted on elastomeric ring so as to ensure adequate sealing of the component parts of the assembly while at the same time positively guarding against any over compression of the resilient portion of the sealing means which could cause an undesirable compression set.

Referring to FIGS. 9, 10 and 11 still another form of the invention is shown. In this embodiment the sealing means is closely similar to that shown in FIGS. 1 and 2 and comprises a rigid portion 80 and an elastomeric portion 82 carried by rigid portion 80. As in the form of the sealing means shown in FIG. 1, rigid portion 80 comprises a generally ring-shaped body 84 having circumferentially extending edges defining first and second surfaces 86 and 88. Affixed to ring-shaped body 84 is a radially inwardly extending ring-shaped member 90 which is generally "T" shaped in cross-section. This "T" shaped member 90 is substantially encapsulated by the elastomeric portion 82 of the assemblage.

As best seen by referring to FIG. 9, unlike the forms of the invention previously discussed, in this embodiment ringshaped body portion 80 is provided in the form of a split ring which defines circumferentially spaced ends 80a and 80b. With this construction expansion and contraction of the ring shaped body found in certain end uses can readily be accommodated.

As indicated in FIG. 10, the elastomeric portion 82 is generally eliptical in cross-section, having upper and lower portions 82a and 82b which protrude above and below the planes of surfaces 86 and 88 when the elastomeric portion is in a relaxed state.

When the sealing means shown in FIG. 10 is positioned within first, or neck, member 12, portion 82b of the elastomeric ring is in engagement with the sealing surface 18 of radially inwardly extending flange 16. In the uncompressed state, the inner circumferentially extending surface of elastomeric portion 82 is slightly spaced apart from second member, or siphon tube, 14. As before, in order to move the sealing means into sealable engagement with member 14, it is necessary that an axial force be exerted on the sealing means in the direction of the arrow 92 of FIG. 11. Once again this axial force is exerted by valve body 20 and the elastomeric portion is controllably deformed to effect sealing in the manner previously described herein.

One advantage of this latter described form of the device resides in the fact that, because of the inclusion of the split ring 80, the sealing means can be used in end applications wherein marked temperature variations might occur. Additionally, in this form of the invention the "T" shaped ring 90 is formed with sharp, rather than rounded, edges for better interconnection with certain types of materials from which the elastomeric portion 82 may be constructed.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A sealing means for forming a fluid seal between first and second cooperating members, said first member having a first sealing surface and said second member having a second sealing surface, said fluid seal being accomplished as a result of a force being exerted on said sealing means by a third member to cause said sealing means to move into sealing engagement with said first and second sealing surfaces to effect a fluid seal therebetween, said sealing means comprising:
   (a) a rigid portion having a first surface engageable by the third member and a second surface engageable with one of the first and second sealing surfaces of the first and second members; and
   (b) an elastomeric portion operably associated with said rigid portion, said elastomeric portion being engageable by said third member to exert a force thereon whereby said elastomeric portion is caused to move into sealing engagement with the first and second sealing surfaces of the first and second members.

2. A sealing means as defined in in claim 1 for forming a fluid seal between a first member having the shape of a hollow cylinder and including a radially inwardly extending, annular shaped first sealing surface and a cylindrically shaped second member receivable within the first member, said first surface of said rigid portion of said sealing means being adapted to engage the third member and said second surface of said rigid portion of said sealing means being adapted to engage the annular shaped sealing surface of the first member.

3. A sealing means as defined in claim 2 in which said rigid portion of said sealing means comprises:
   (a) a generally ring shaped body, the circumferentially extending edges of which define said first and second surfaces; and
   (b) inwardly extending, generally ring shaped first member affixed to said ring shaped body, said first member being generally "T" shaped in cross-section.

4. A sealing means as defined in claim 3 in which said radially inward extending ring shaped member is substantially encapsulated within said elastomeric portion.

5. A sealing means as defined in claim 3 in which said ring shaped body and said inwardly extending ring shaped member are interrupted to define circumferentially spaced apart ends.

6. A sealing means as defined in claim 3 further including a radially outwardly extending generally ring shaped second member affixed to said ring shaped body, said second member being generally "T" shaped in cross-section.

7. A sealing means as defined in claim 2 in which said rigid portion of said sealing means comprises:
   (a) a generally ring shaped body; and
   (b) a radially inwardly extending, generally annular shaped portion affixed to said ring shaped body.

* * * * *